United States Patent [19]

Thomson et al.

[11] 4,190,576
[45] Feb. 26, 1980

[54] SEPARATION OF MACROMOLECULES

[75] Inventors: Alan R. Thomson, Abingdon; Brynley J. Miles, Faringdon, both of England

[73] Assignee: United Kingdom Atomic Energy Authority, London, England

[21] Appl. No.: 743,292

[22] Filed: Nov. 18, 1976

[30] Foreign Application Priority Data

Nov. 26, 1975 [GB] United Kingdom ............... 48693/75

[51] Int. Cl.² .................. A23J 1/20; B01D 15/04
[52] U.S. Cl. ........................ 260/122; 210/24; 210/40; 210/284; 260/112 R
[58] Field of Search ............... 260/112 R, 122, 2.1 M; 210/24 R, 40

[56] References Cited

U.S. PATENT DOCUMENTS

| | | | |
|---|---|---|---|
| 3,234,199 | 2/1966 | Reid | 260/112 R |
| 3,382,032 | 5/1968 | Kraus | 210/24 R X |
| 3,487,064 | 12/1969 | Swanson et al. | 260/112 R |
| 3,573,277 | 3/1971 | Grant | 260/112 R X |
| 3,625,886 | 12/1971 | Mattia | 210/40 X |
| 3,676,423 | 7/1972 | Elizer | 260/2.1 M X |
| 3,838,143 | 9/1974 | Grant | 260/112 R |
| 3,943,072 | 3/1976 | Thomson et al. | 252/455 R |

Primary Examiner—Walter C. Danison
Attorney, Agent, or Firm—Larson, Taylor and Hinds

[57] ABSTRACT

A process is disclosed for the separation of macromolecules from a fluid substance containing the macromolecules.

The process comprises contacting the fluid substance with discrete porous particles having an interconnected porosity throughout which provides an extended surface area and a pore structure such as will allow the macromolecules to permeate the particles and be sorbed, the discrete porous particles being selected such that a proportion thereof have acidic surfaces for contacting the macromolecules in the fluid substance and a proportion thereof have basic surfaces for contacting the macromolecules in the fluid substance.

A process for the separation of protein from milk whey solution is also disclosed.

13 Claims, 1 Drawing Figure

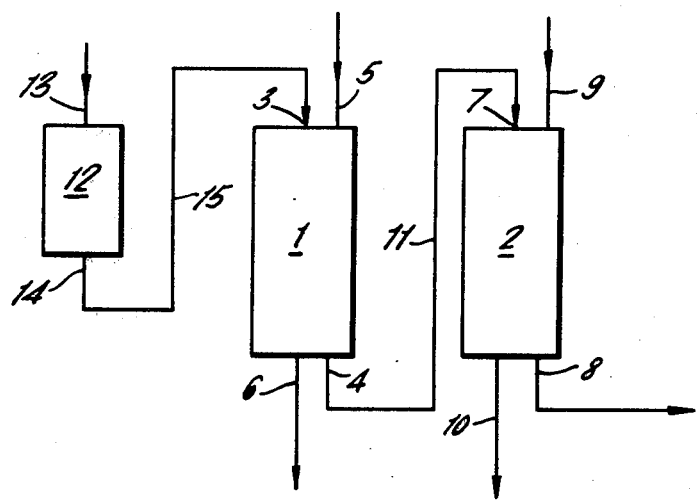

SEPARATION OF MACROMOLECULES

The present invention relates to the separation of macromolecules from a fluid substance containing said macromolecules.

According to a first aspect of the present invention there is provided a process for the separation of macromolecules from a fluid substance containing the macromolecules which comprises contacting the fluid substance with discrete porous particles having an interconnected porosity throughout which provides an extended surface area and a pore structure such as will allow the macromolecules to permeate the particles and be sorbed, the discrete porous particles being selected such that a proportion thereof have acidic surfaces for contacting the macromolecules in the fluid substance and a proportion thereof have basic surfaces for contacting the macromolecules in the fluid substance.

We have found that certain macromolecular separations can be advantageously effected by use of more than one type of porous particle.

In one preferred embodiment of the present invention the discrete porous particles are those prepared by a method as claimed in any one of claims 1 to 10 of our U.S. Patent No. 3,943,072.

The above mentioned U.S. Patent discribes and claims inter alia:

"A method for producing an inorganic material having interconnected porosity throughout the material for the selective retention of predetermined molecules from a fluid substance containing said molecules including the steps of: mixing a finely divided, substantially insoluble, sorptive, inorganic material, capable of sorbing the molecules, with a solid fugitive additive to form a mixture, including in the mixture a solvent to dissolve fugitive additive in the solvent, said inorganic material being substantially insoluble in said solvent, forming discrete particles from the mixture, and heating the particles to remove solvent and fugitive additive to produce discrete particles of said inorganic material having an interconnected pore structure throughout said discrete particles providing an extended surface area, the pore size being such as will allow said predetermined molecules in said fluid substance to permeate the inorganic particles and be sorbed, said inorganic material being substantially unaffected by said heating utilized to effect removal of solvent and fugitive additive."

Discrete porous particles produced in accordance with U.S. Pat. No. 3,943,072 may be substabtially spherical in shape and have a size in the range of 50–600$\mu$ diameter. The pore structure may contain pores having a diameter in the range 1000 to 10000 Å.

Examples of fugitive additives which may be used in accordance with U.S. Pat. No. 3,943,072 are ammonium carbonate, haemoglobin, dextran, polyvinyl alcohol, urea, bovine serum albumin and ovalbumin. Optionally a binding agent may be included in the mixture in addition to the fugitive additive.

Examples of finely divided, substantially insoluble, sorptive inorganic materials which may be used in accordance with U.S. Pat. No. 3,943,072 are titanium dioxide, aluminium oxide, barium sulphate, calcium phosphate, zirconium oxide and calcium sulphate.

In the separation of macromolecules in accordance with the foregoing aspect of the present invention basic macromolecules are retained from the fluid substance by discrete porous particles having acidic surfaces and acidic macromolecules are retained by discrete porous particles having basic surfaces.

The terms "acidic" and "basic" as used herein in relation to the surfaces of the discrete porous particles mean that the surfaces are, respectively, predominantly acidic and basic relative to the particular macromolecules in the fluid substance. Thus, a surface which is "acidic" with respect to one particular species of macromolecule may be "basic" with respect to another species of macromolecule.

The terms "acidic" and "basic" as used herein in relation to macromolecules mean that the macromolecules have, respectively, a net acidic charge and a net basic charge.

Further we have found that the surface characteristics of the particles can be affected by the conditions (e.g. pH) under which the particles and macromolecules are contacted. Thus particular discrete porous particles may present acidic surfaces to a given species of macromolecule under one set of conditions, but under other conditions may present a basic surface.

In one embodiment of the process of the foregoing aspect of the present invention the fluid substance may be contacted with a mixed bed of the discrete porous particles said bed containing particles having acidic surfaces for contacting the macromolecules and particles having basic surfaces for contacting the macromolecules.

In a second embodiment of the process of the foregoing aspect of the present invention the fluid substance may be contacted sequentially with a plurality of beds of the discrete porous particles, at least one bed comprising discrete porous particles having acidic surfaces for contacting the macromolecules and at least one other bed comprising discrete porous particles having basic surfaces for contacting the macromolecules.

Conveniently two beds of discrete porous particles may be used and the process can be operated so that the fluid substance is contacted first with a bed which comprises particles having acidic surfaces and subsequently with a bed which comprises particles having basic surfaces, or vice versa.

Proteins are examples of macromolecules which can be separated from a fluid substance in accordance with the present invention.

In accordance with a second aspect the present invention provides a process for the separation of protein from milk whey solution comprising contacting the solution with discrete porous particles having an interconnected porosity throughout which provides an extended surface area and a pore structure such as will allow protein to permeate the particles and be sorbed, a proportion of the particles having acidic surfaces for contacting protein and a proportion having basic surfaces for contacting protein.

In one embodiment of the second aspect of the present invention a process for the separation of proteins from a milk whey solution comprises contacting the solution with a bed comprising discrete porous titania particles under conditions such that the particles have acidic surfaces, whereby basic (predominantly positively charged) proteins in the solution are retained on the titania particles, and contacting the solution with a bed comprising discrete porous alumina particles under conditions such that these particles have basic surfaces, whereby acidic (predominantly negatively charged) proteins are retained on the alumina particles.

The whey solution can be contacted first with the titania particles and the resulting solution contacted with the alumina particles, or alternatively the whey solution can be contacted with the alumina first and subsequently with the titania.

The porous titania particles and porous alumina particles are preferably those prepared by a method as claimed in any one of claims 1 to 10 of our U.S. Pat. 3,943,072.

Examples of basic proteins in milk whey are lactoglobulin and lactoferrin, and an example of acidic proteins is lactalbumin.

The actual composition of milk whey depends upon the process in which it arises. Thus in the production of hard cheese so-called "sweet" whey is produced (pH 5 to 7) whereas in the production of soft cheese (e.g. cottage cheese) so-called "acid" whey is produced (p4 to 5). A typical "sweet" whey composition is as follows: 93% water, 5% lactose, 0.6% protein, 0.3% fat, 0.6% ash.

The solution obtained after contacting with the two beds contains mainly lactose and salts, and the basic and acidic proteins can be subsequently recovered from the beds in an undenatured form by selective elution of the beds with suitable reagents (e.g. 0.1 M potassium phosphate, 0.2 M potassium pyrophosphate).

Thus, for example, undenatured lactalbumin can be recovered as a substantially pure product from the bed comprising discrete porous alumina particles having basic surfaces.

Alkali (e.g. 0.1 M NaOH containing a salt such as NaCl) may be used to elute all proteins from a particular bed. It will be understood that the pH of the eluted proteins will generally be lower than the pH of the eluting alkali and that the proteins recovered in this way may not be in their natural form.

We have found that using two beds, (one of titania particles and one of alumina particles (prepared in accordance with U.S. Pat. No. 3,943,072)) up to 99% recovery of substantially lactose-free whey proteins may be achieved in a single pass. The order of the titania and alumina particle beds may, if desired, be reversed so that the whey solution contacts the alumina particles first.

Gross particulate matter is preferably removed from the whey solution (e.g. by means of a coarse filter) prior to contacting with the beds comprising the discrete porous particles.

The whey solution itself may be utilized for bedumn equilibration and we believe that conveniently retention/elution cycles of ½ to 2 hours can be used dependent on the protein concentration in the whey solution and the configuration of the bed.

The present invention also provides, according to another aspect, an apparatus for the separation of macromolecules from a fluid substance containing the macromolecules which comprises at least one vessel containing discrete porous particles prepared by the method of the invention disclosed in U.S. Pat. No. 3,943,072, a proportion of the discrete porous particles having acidic surfaces for contacting the macromolecules in the fluid substance and a proportion of the discrete porous particles having basic surfaces for contacting the macromolecules in the fluid substance.

In one embodiment of the apparatus of the present invention there is provided one vessel containing a mixed bed of the discrete porous particles said bed containing particles having acidic surfaces for contacting the macromolecules and particles having basic surfaces for contacting the macromolecules.

In a second embodiment of the apparatus of the present invention there is provided a plurality of inter-connected vessels at least one of the vessels containing a bed of the discrete porous particles having acidic surfaces for contacting the macromolecules and at least one other of the vessels containing a bed of the discrete porous particles having basic surfaces for contacting the macromolecules.

We have found that separation of the macromolecules in accordance with the present invention can be carried out over a wide pH range. For example fluid substances have been treated at pH values between 3 and 10.

In our—U.S. Pat. No. 3,043,072 hereinbefore mentioned reference is made to the use of specific interaction between material and macromolecules in certain instances. It will be appreciated that the use of such specific interactions is also applicable in the present invention.

The invention will now be particularly described, by way of example only, as follows:

EXAMPLE

Proteins were separated from a milk whey solution using discrete porous particles of titania and alumina prepared by the method of the invention disclosed in U.S. Pat. No. 3,943,072.

The separation was conducted in an apparatus comprising two columns connected in series, one column containing a bed of the titania particles (20 g) and the other a bed of the alumina particles (20 g).

The milk whey was a so-called "acid" whey.

Prior to treating the milk whey solution the columns were equilibrated to pH 4.7 with dilute HCl.

A sample of milk whey solution containing 100 mg of protein was introduced into the apparatus and passed firstly through the bed of titania particles and subsequently through the bed of alumina particles. The sample solution was washed through the apparatus with dilute HCl and the liquid leaving the alumina bed collected.

The columns were isolated from each other and eluted separately with 0.2 M potassium pyrophosphate to recover the proteins removed from the whey solution to give separate fractions containing proteins.

The columns were subsequently eluted with 0.1 M NaOH containing salt to recover strongly sorbed proteins. In addition to cleaning the columns of strongly sorbed proteins the use of strong alkali provides a means of inhibiting bacterial growth on the porous particles.

Protein determinations (Folin-Ciocalteau method) were carried out on the fractions from the columns and on the liquid collected after the alumina bed.

It was found that 1.1 mg protein had not been retained by either of the beds and that the titania and alumina beds had retained 89.5 mg and 9.4 mg of protein respectively. (Of the 89.5 mg, 83.8 mg were removed by the pyrophosphate and 5.7 by the alkali). Thus the beds had together retained 98.9% of the protein in the sample of whey solution.

The fractions and the liquid collected after the alumina bed were further investigated by a standard (Gelman Cellulose Acetate) electrophoretic separation technique using $\beta$-lactoglobulin and $\alpha$-lactalbumin as standards.

No visible bands were obtained on the cellulose acetate with the liquid collected after the alumina bed (i.e. little or no protein present).

The fraction from the titania bed gave visible protein bands corresponding mainly to β-lactoglobulin. The fraction from the alumina bed gave one band only corresponding to α-lactalbumin.

Columns as hereinbefore described in the Example may be used with flow rates of 2 to 50 column volumes/hour. It will be appreciated that yields of proteins may vary according to flow rate.

The invention will now be further described, by way of example only, with reference to the single figure of the accompanying drawing which shows a diagrammatic representation of an apparatus for the separation of macromolecules in accordance with the present invention.

Referring now to the figure there is shown a column 1 containing a bed comprising discrete porous titania particles and a column 2 containing a bed comprising discrete porous alumina particles.

Column 1 is provided with a process solution inlet 3, a process solution outlet 4, an eluting agent inlet 5 and an eluate outlet 6.

Column 2 is provided with a process solution inlet 7, a process solution outlet 8, an eluting agent inlet 9 and an eluate outlet 10. The process solution outlet 4 of column 1 is connected to the process solution inlet 7 of column 2 by means of pipe 11.

A filter 12 is provided having a process solution inlet 13 and a process solution outlet 14. The process solution outlet 14 is connected to the process solution inlet 3 of column 1 by means of pipe 15.

In operation a process solution comprising a fluid substance containing macromolecules (e.g. a milk whey solution) is introduced through inlet 13 to the filter 12 wherein gross particulate matter is removed from the process solution. The filtered process solution leaves the filter 12 via the outlet 14 and flows via pipe 15 to the process solution inlet 3 of column 1. The process solution then passes through the bed of discrete porous titania particles in column 1 whereupon basic macromolecules in the process solution (e.g. lactoglobulin and lactoferrin the case of a milk whey solution) are retained in the column 1.

The resulting process solution leaves column 1 via outlet 4 and flows via pipe 11 to the process solution inlet 7 of column 2. The process solution passes through the bed of discrete porous alumina spheres in column 2 whereupon acidic macromolecules in the process solution (e.g. lactalbumin in the case of a milk whey solution) are retained in the column 2.

The resulting process solution from which basic and acidic macromolecules have been removed leaves the column 2 via the outlet 8 and can be subjected to further processing or run to waste as desired.

When the desired amounts of macromolecules have been retained by the discrete porous particles in the columns 1 and 2 or when the maximum loading of the particles has been achieved, the flow of process solution through the apparatus is stopped, the columns 1 and 2 are isolated and eluting agents are passed through the columns 1 and 2 by means of eluting agent inlets 5 and 9 respectively. The basic and acidic macromolecules are eluted from the discrete porous particles by the eluting agents and are removed from the columns 1 and 2 by the eluate outlets 6 and 10 respectively as separate product streams.

It will be understood that the isolation of the columns, the passage of eluting agents and the recovery of the separate product streams is achieved by appropriate operation of valves provided in the apparatus. These valves are not shown in the figure which is merely diagrammatic.

When elution of macromolecules has proceeded to the desired extent the passage of eluting agents through the columns 1 and 2 is stopped. The cycle of passing process solution through the apparatus to retain macromolecules from the process solution and the subsequent elution of the macromolecules from the columns can be repeated as desired. The cycle can be arranged to be operated automatically.

We claim:

1. A process for the separation of macromolecules from a fluid substance containing the macromolecules which comprises contacting the fluid substance with discrete porous absorbent particles of inorganic material having an interconnected porosity throughout which provides an extended surface area and a pore structure such as will allow the macromolecules to permeate the particles and be sorbed, the pores of said particles having a diameter in the range of 1,000 to 10,000 A, the discrete porous particles being selected such that a proportion thereof have acidic surfaces for contacting the macromolecules in the fluid substance and a proportion thereof have basic surfaces for contacting the macromolecules in the fluid substance.

2. A process as claimed in claim 1 wherein the fluid substance is contacted with a mixed bed of the discrete porous absorbent particles of inorganic material said bed containing particles having acidic surfaces for contacting the macromolecules and particles having basic surfaces for contacting the macromolecules.

3. A process as claimed in claim 1 wherein the fluid substance is contacted sequentially with a plurality of beds of the discrete porous particles, at least one bed comprising discrete porous absorbent particles of inorganic material having acidic surfaces for contacting the macromolecules and at least one other bed comprising discrete porous particles of inorganic material having basic surfaces for contacting the macromolecules.

4. A process as claimed in claim 1 wherein the discrete porous absorbent particles are of inorganic material prepared by mixing a finely divided, substantially insoluble, sorptive, inorganic material, capable of sorbing the molecules, with a solid fugitive additive to form a mixture, including in the mixture a solvent to dissolve fugitive additive in the solvent, said inorganic material being substantially insoluble in said solvent, forming discrete particles from the mixture, and heating the particles to remove solvent and fugitive additive to produce said discrete particles of said inorganic material.

5. A process as claimed in claim 1 wherein the macromolecules are recovered from the porous particles by selective elution.

6. A process as claimed in claim 1 wherein the macromolecules are protein molecules.

7. A process for the separation of protein from a milk whey solution comprising contacting the solution with discrete porous absorbent particles of inorganic material having an interconnected porosity throughout which provides an extended surfaces area and a pore structure such as will allow protein to permeate the particles and be sorbed, a proportion of the particles having acidic surfaces for contacting protein and a proportion having basic surfaces for contacting protein.

8. A process as claimed in claim 7 wherein the solution is contacted with a bed comprising discrete porous titania particles under conditions such that the particles have acidic surfaces, whereby basic proteins in the solution are retained on the titania particles, and the solution is contacted with a bed comprising discrete porous alumina particles under conditions such that these particles have basic surfaces, whereby acidic proteins are retained on the alumina particles.

9. A process as claimed in claim 8 wherein the titania particles are those prepared by mixing finely divided titania with a solid fugitive additive to form a mixture, including in the mixture of solvent to dissolve said fugitive additive, said titania being insoluble in said solvent, forming discrete particles from the mixture and heating the particles to remove solvent and fugitive additive to produce said titania particles.

10. A process as claimed in claim 7 wherein protein is recovered from the discrete porous particles by selective elution.

11. A process as claimed in claim 7 wherein the protein comprises lactoglobulin, lactoferrin or lactalbumin.

12. An undenatured protein obtainable by a process as claimed in claim 10.

13. A process as claimed in claim 8 wherein the alumina particles are those prepared by mixing finely divided alumina with a solid fugitive additive to form a mixture, includin the mixture a solvent to dissolve said alumina, said alumina being insoluble in said solvent, forming discrete particles from the mixture and heating the particles to remove solvent and fugitive additive to produce said alumina particles.

* * * * *